United States Patent

Ammann et al.

[11] Patent Number: 6,162,281
[45] Date of Patent: Dec. 19, 2000

[54] DEVICE AND PROCESS FOR DISPLAYING THE EXHAUSTION OF A GAS FILTER

[75] Inventors: Klaus Ammann, Sereetz; Wolfgang Bäther; Michael Dietrich, both of Lübeck, all of Germany

[73] Assignee: Dräger Sicherheitstechnik GmbH, Germany

[21] Appl. No.: 09/321,464

[22] Filed: May 27, 1999

[30] Foreign Application Priority Data

Dec. 23, 1998 [DE] Germany ............................ 198 59 788

[51] Int. Cl.⁷ .................................................. B01D 53/04
[52] U.S. Cl. ................................. 95/8; 95/90; 96/117.5; 96/147; 55/DIG. 34
[58] Field of Search ......................... 95/8, 11, 12, 90; 96/108, 111, 117, 117.5, 147; 55/DIG. 33, DIG. 34, DIG. 35

[56] References Cited

U.S. PATENT DOCUMENTS

| | | | |
|---|---|---|---|
| 3,400,511 | 9/1968 | Yamanouchi | 95/11 |
| 3,902,485 | 9/1975 | Wallace | 96/117.5 X |
| 3,950,155 | 4/1976 | Komiyama | 55/DIG. 34 |
| 4,237,726 | 12/1980 | Peterson et al. | 96/117.5 X |
| 4,365,627 | 12/1982 | Wing | 96/117.5 X |
| 4,440,162 | 4/1984 | Sewell et al. | 55/DIG. 33 |
| 4,685,938 | 8/1987 | Oliker | 96/117 X |
| 5,151,251 | 9/1992 | Solcia et al. | 55/DIG. 34 |
| 5,294,407 | 3/1994 | Succi et al. | 96/117.5 X |
| 5,685,895 | 11/1997 | Hagiwara et al. | 96/117 |
| 5,853,455 | 12/1998 | Gibson | 95/11 |

FOREIGN PATENT DOCUMENTS

| | | | |
|---|---|---|---|
| 239947A | 10/1986 | Germany | 95/11 |
| 88 14 222 | 5/1989 | Germany. | |
| 62-097622A | 5/1987 | Japan | 95/11 |

*Primary Examiner*—Robert H. Spitzer
*Attorney, Agent, or Firm*—McGlew and Tuttle, P.C.

[57] ABSTRACT

A device for displaying the exhaustion of a gas filter filled with an adsorbent (3). A toxic gas detector (14) determines the toxic gas content at a sampling site (8) within the adsorbent (3). A reference sampling site (12) is located in the area of a gas inlet point (6) of the gas filter (2). The toxic gas detector is designed such that it determines the toxic gas content alternately at the sampling sites (8, 12), and the exhaustion of the filter is determined by a comparison of the toxic gas content at the sampling site (8) with the toxic gas content at the reference sampling site (12).

14 Claims, 2 Drawing Sheets

DEVICE AND PROCESS FOR DISPLAYING THE EXHAUSTION OF A GAS FILTER

FIELD OF THE INVENTION

The present invention pertains to a device for displaying the exhaustion of a gas filter filled with an adsorbent with a toxic gas detector detecting the toxic gas content at a sampling site within the adsorbent.

BACKGROUND OF THE INVENTION

Gas filter devices protect their user from inhaling gases and vapors hazardous to health. This protection lasts until the adsorption capacity of the filter is exhausted. The time period from the start of the use of the filter to the point in time at which relevant concentrations of the component to be separated by the filter, i.e., concentrations that are harmful to the user of the filter, appear on the inhalation side, is called the retention time. The filter retention time depends on a number of parameters, e.g., the type and amount of the adsorbent contained in the filter, the design of the filter, the type and amount of the toxic substance, the environmental conditions, such as the temperature and the relative humidity, as well as the respiratory minute volume of the user. To make possible the effective protection of the user of the gas filter device from filter breakthrough, he must be warned well ahead of time to ensure that sufficient time is left for him to leave the hazardous area.

A gas filter, in which a toxic gas detector is arranged within the adsorbent bed to display the state of saturation of the bed, has been known from Utility Model No. DE 88 14 222 U1. The drawback of the prior-art arrangement is that only an absolute measurement can be performed with the prior-art toxic gas detector and a preliminary standardization of the toxic gas detector is therefore necessary to eliminate drift processes. However, such a standardization can be performed with difficulty only in the case of a toxic gas detector integrated within the adsorbent bed, because direct exposure of the detector to a test gas is not possible.

SUMMARY AND OBJECTS OF THE INVENTION

The basic object of the present invention is to provide a device for displaying the exhaustion of a gas filter, with which the standardization of the toxic gas detector can be performed in a simple manner, as well as a process for determining the exhaustion of the filter.

According to the invention, a gas filter with filter exhaustion display, is provided including a gas filter filled with adsorbent and having a gas inlet region. A toxic gas detector is provided for detecting the toxic gas content at a sampling site within the adsorbent. A reference sampling site is also provided in an area of the gas inlet region of the gas filter, the gas detector alternately detecting the toxic gas content at the sampling site and the reference sampling site. A display of the exhaustion of the filter is formed by a comparison of the toxic gas content at the sampling site with the toxic gas content at the reference sampling site.

According to a further aspect of the invention, a process is provided for determining the exhaustion of a gas filter filled with an adsorbent. The process includes providing a toxic gas content adsorbent sampling site within the adsorbent and providing a toxic gas content reference sampling site in an area of a filter gas inlet region. The toxic gas reference concentration at the reference sampling site is measured with a gas detector. The toxic gas reference concentration at the adsorbent sampling site is also measured with the gas detector (e.g., the same or different gas detector). A display of the exhaustion of the filter is formed by comparing the toxic gas content measured at the sampling site with the toxic gas concentration at the reference sampling site.

The advantage of the present invention is essentially that due to an additional sampling site at the point of entry of the gas into the gas filter, which sampling site acts as a reference sampling site, and due to a comparative measurement of the toxic gas content with the same toxic gas detector at both the reference sampling site and at the sampling site within the adsorbent bed, an additional standardization is no longer necessary, and an absolute measurement of the toxic gas content may be omitted. Since only a comparison of the concentrations of the toxic gas molecules before and within an adsorbent bed is performed with the device according to the present invention, it is also possible to use toxic gas detectors that determine the concentration of the toxic gas only nonspecifically for the measurements. This permits, in particular, inexpensive measuring systems to be used.

A plurality of sampling sites, which can be connected to the toxic gas detector, are advantageously arranged in the direction of flow of the gas filter, wherein the exhaustion of the filter is determined by a comparison of the toxic gas content at each of the sampling sites within the adsorbent with the reference sampling site. The load of the gas filter can thus be represented in the form of a pattern assigned to the sampling sites, as a result of which the residual adsorption capacity of the adsorbent bed can be stated better.

It is especially advantageous to perform the comparison of the toxic gas content at the reference sampling site with the toxic gas content at the sampling site within the adsorbent bed by forming the quotient of the measured values. A dimensionless adsorption value of the gas filter is thus obtained, which has a value of 1 with the adsorbent bed completely loaded and a value markedly lower than 1 at the maximum adsorption capacity. The loading of the adsorbent bed can be described particularly clearly in the form of a bar chart due to this standardization. It is useful for the sampling sites to be located at equally spaced locations from one another within the adsorbent bed.

A photoionization detector (PID), which permits the nonspecific detection of the toxic gas molecules, is particularly suitable for use as a toxic gas detector.

One exemplary embodiment of the present invention is shown in the figure and will be explained in greater detail below.

The various. features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
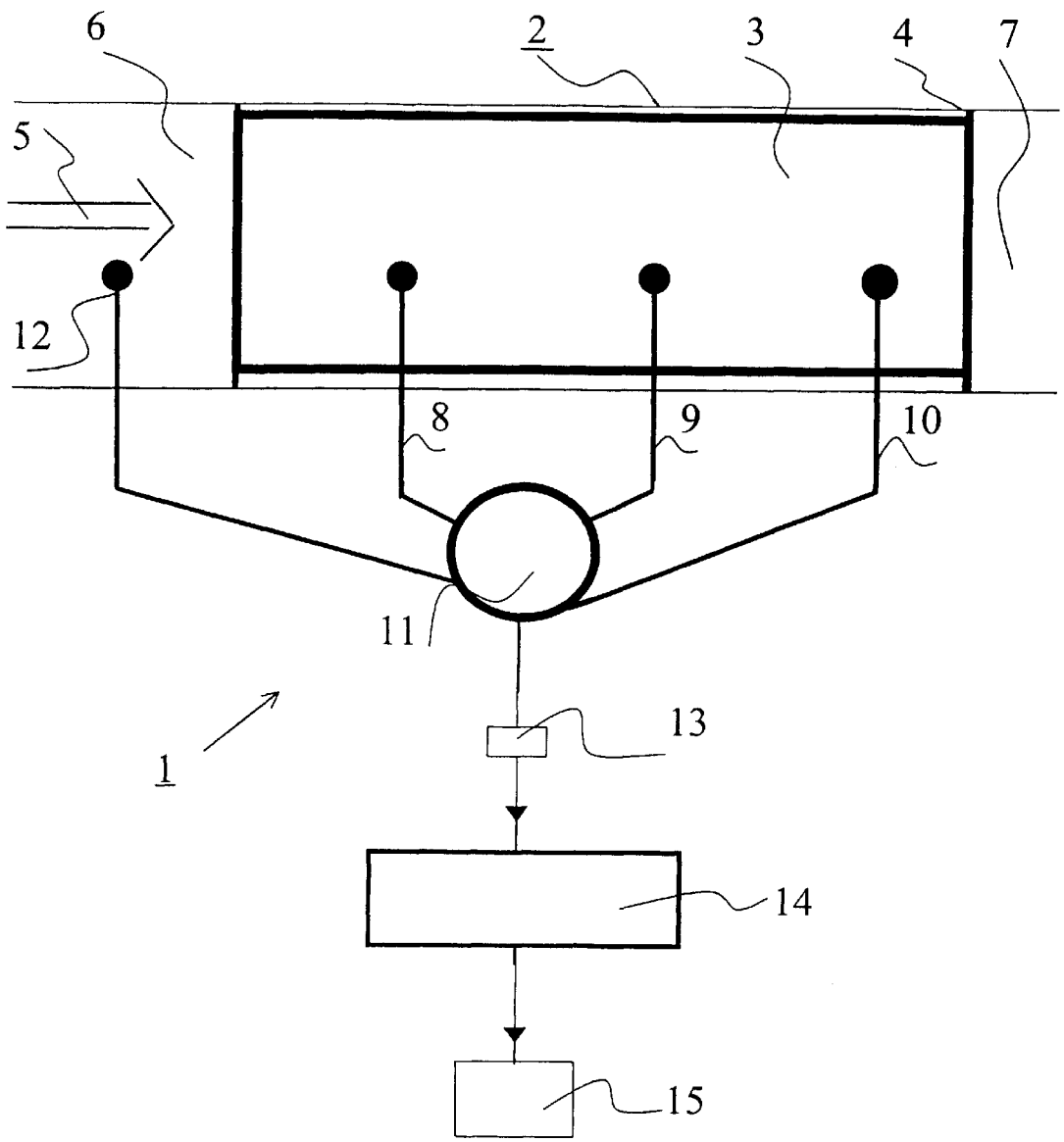
FIG. 1 is a schematic view of a measuring device for displaying the exhaustion of a filter.

Referring to the drawings in particular, FIG. 1 schematically illustrates the design of a measuring device 1 according to the present invention for detecting the toxic gas loading of a gas filter 2. The gas filter 2 comprises a filter housing 4 filled with an adsorbent 3 and gas flows through it in the direction of the arrow 5 from a gas inlet point 6 to a gas outlet point 7. The gas outlet point 7 is connected to a breathing mask, not shown in FIG. 1. Individual sampling sites 8, 9, 10, which are connected to a measuring point changeover switch 11, are arranged within the gas filter 2 in the longitudinal direction of the adsorbent 3. The sampling sites 8, 9, 10 are at equally spaced locations from one another within the adsorbent 3. A reference sampling site 12, which is likewise connected to the measuring point changeover switch 11, is located at the gas inlet point 6 of the gas filter 2. A gas sampling pump 13, a photoionization detector 14, and a display unit 15 are arranged downstream of the measuring point changeover switch 11.

The measuring device 1 according to the present invention operates as follows:

Switching over is performed continuously with the measuring point changeover switch 11 between the sampling sites 8, 9, 10 and the reference sampling site 12, and the photoionization detector 14 determines the toxic gas contents at the sampling sites 8, 9, 10, 12 one after another. The gas samples to be analyzed are drawn in by the gas sampling pump 13. The quotients of the toxic gas contents measured at the sampling sites 8, 9, 10 and the toxic gas content at the reference sampling site 12 are then formed in an evaluating unit of the photoionization detector 14, not shown in FIG. 1. A signal pattern 16 related to the sampling sites 8, 9, 10 is obtained from this in the form of a bar chart shown in FIG. 2, from which the state of loading of the gas filter 2 can be read. This signal pattern 16 is output and displayed via the display unit 15, FIG. 1.

Figure 2:
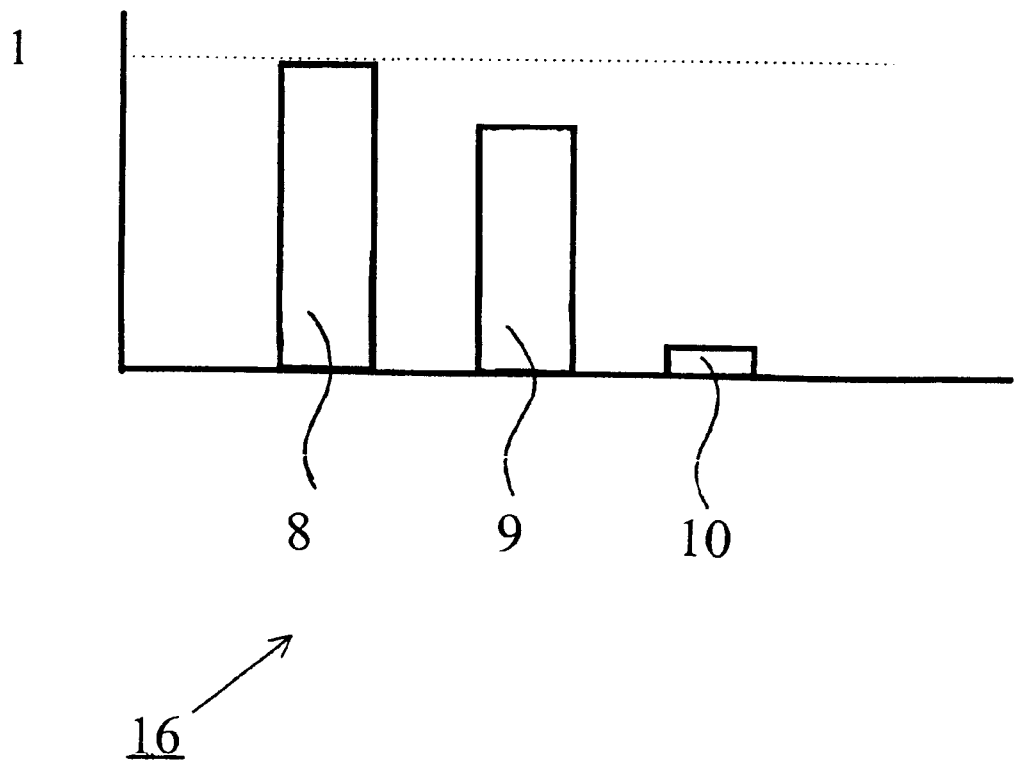
FIG. 2 is a signal pattern for displaying the exhaustion of a filter.

In the signal pattern 16 shown in FIG. 2, the adsorption capacity of the adsorbent 3 has already been reached at the sampling site 8. The ratio of the toxic gas concentration at sampling site 8 to the toxic gas concentration at the reference sampling site 12 has already reached the value of 1. A certain residual adsorption capacity is still present at sampling site 9, so that a value lower than 1 is obtained here. A range with maximum adsorption capacity of the adsorbent 3 is still present at sampling site 12.

While specific embodiments of the invention have been shown and described in detail to illustrate the application of the principles of the invention, it will be understood that the invention may be embodied otherwise without departing from such principles.

What is claimed is:

1. A process for determining the exhaustion of a gas filter filled with an adsorbent, the process comprising the steps of:
   providing a toxic gas content adsorbent sampling site within the adsorbent;
   providing a toxic gas content reference sampling site in an area of a filter gas inlet region;
   measuring a toxic gas reference concentration at said reference sampling site with a gas detector;
   measuring a toxic gas reference concentration at said adsorbent sampling site with the gas detector; and
   forming a display of the exhaustion of the filter by comparing the toxic gas content measured at said adsorbent sampling site with the toxic gas concentration at said reference sampling site.

2. The process in accordance with claim 1, wherein the comparison is performed by forming the quotient.

3. A gas filter with filter exhaustion display, comprising:
   a gas filter filled with adsorbent and having a gas inlet region;
   a toxic gas detector for detecting a toxic gas content at a sampling site within the adsorbent;
   a reference sampling site provided in an area of said gas inlet region of said gas filter, said gas detector alternately detecting the toxic gas content at said sampling site and said reference sampling site;
   a display of the exhaustion of said filter formed by a comparison of the toxic gas content at said sampling site with the toxic gas content at said reference sampling site.

4. The device in accordance with claim 3, further comprising additional sampling sites provided at locations extending in a direction of flow through said gas filter, said display of the exhaustion of said filter being formed by comparing the toxic gas contents of at least some one of said sampling site and one or more of said additional sampling sites with the toxic gas content at said reference sampling site.

5. The device in accordance with claim 4, wherein at least some of said sampling sites within said adsorbent are located at equally spaced locations from one another.

6. The device in accordance with claim 3, wherein the comparing to form said display includes forming a quotient.

7. The device in accordance with claim 3 further comprising exhaust means connected to said sampling sites for exhaustive gas sampling.

8. The device in accordance with claim 7, further comprising a toxic gas photoionization detector (PID) connected to said sampling sites.

9. A gas filter and filter exhaustion display system, comprising:
   a gas filter filled with adsorbent and having a gas inlet region;
   a first sampling site within the adsorbent;
   a second sampling site within the adsorbent;
   a reference sampling site provided in an area of said gas inlet region of said gas filter;
   a toxic gas detector for detecting a toxic gas content, said gas detector alternately detecting a toxic gas content at one or both of said first sampling site and said second sampling site, and said gas detector detecting a toxic gas content at said reference sampling site;
   a display of the exhaustion of said filter formed by a comparison of the toxic gas content at one or both of said first sampling site and said second sampling site with the toxic gas content at said reference sampling site.

10. The device in accordance with claim 9, further comprising additional sampling sites provided at locations extending in a direction of flow through said gas filter, said display of the exhaustion of said filter being formed by comparing the toxic gas contents of at least one of said first and second sampling sites and one or more of said additional sampling sites with the toxic gas content at said reference sampling site.

11. The device in accordance with claim 10, wherein at least some of said sampling sites within said adsorbent are located at equally spaced locations from one another.

12. The device in accordance with claim 9, wherein the comparing to form said display includes forming a quotient.

13. The device in accordance with claim 9, further comprising exhaust means connected to said sampling sites for exhaustive gas sampling.

14. The device in accordance with claim 13, further comprising a toxic gas photoionization detector (PID) connected to said sampling sites.

* * * * *